United States Patent [19]

Meyerle

[11] Patent Number: 5,035,310
[45] Date of Patent: Jul. 30, 1991

[54] CLUTCH, PARTICULARLY FOR AUTOMATIC TRANSMISSION FOR AUTOMOTIVE VEHICLES

[76] Inventor: Michael Meyerle, Kiefernweg 9, Meckenbeuren-Lochbrucke, Fed. Rep. of Germany

[21] Appl. No.: 436,094

[22] Filed: Nov. 13, 1989

Related U.S. Application Data

[63] Continuation of Ser. No. 07/192,511, Apr. 26, 1988, abandoned.

[30] Foreign Application Priority Data

Jul. 23, 1986 [DE] Fed. Rep. of Germany ....... 3624894
Jan. 14, 1987 [DE] Fed. Rep. of Germany ....... 3700813

[51] Int. Cl.⁵ .................. F16D 25/061; B60T 1/00
[52] U.S. Cl. .................. 192/48.5; 192/85 A; 192/87.11; 192/87.15; 192/108
[58] Field of Search ........... 192/67 R, 85 A, 87.11, 192/87.16, 87.17, 101, 108, 86, 48.5, 87.15

[56] References Cited

U.S. PATENT DOCUMENTS

| | | | |
|---|---|---|---|
| 2,428,336 | 9/1947 | Munschauer | 192/85 A |
| 2,735,528 | 2/1956 | Dodge | 192/67 R |
| 2,864,479 | 12/1958 | Schindler | 192/85 AA |
| 2,962,142 | 11/1960 | Straub | 192/85 A |
| 2,972,905 | 2/1961 | Bullard | 74/681 |
| 3,063,529 | 11/1962 | Cook | 192/87.11 |
| 3,424,285 | 1/1969 | McRay | 192/87.17 |
| 4,408,684 | 10/1983 | Gladich | 192/108 |
| 4,440,041 | 4/1984 | Bendtsen | 192/87.16 |
| 4,549,639 | 10/1985 | Hansen | 192/87.17 |
| 4,768,398 | 9/1988 | Greenwood | 74/691 |

FOREIGN PATENT DOCUMENTS

1193317 5/1965 Fed. Rep. of Germany .
517952 12/1920 France ................. 192/108

Primary Examiner—Rodney H. Bonck
Attorney, Agent, or Firm—Staas & Halsey

[57] ABSTRACT

A clutch mechanism, particularly for automatically operated automotive transmissions, for engaging shift ranges of continuously variable transmissions or step-by-step variable transmissions, and having at least two independently axially movable clutch rings with clutch profiles which cooperate with respective corresponding mating clutch rings clutch profiles, a clutch carrier mounted on a transmission element for rotation therewith in a fixed axial position, and having fluid actuated pressure pistons for shifting the movable clutch rings toward the mating rings. The clutch system can be disengaged under load and requires a small construction space. It can be produced at low cost and is almost free from drag losses. Clutch times and clutch travels are short. The shift pressures are very low. In addition, several clutches can be combined into a compact and relatively small clutch assembly.

9 Claims, 5 Drawing Sheets

CLUTCH, PARTICULARLY FOR AUTOMATIC TRANSMISSION FOR AUTOMOTIVE VEHICLES

This is a continuation of copending application Ser. No. 07/192,511, filed on Apr. 26, 1988 and now abandoned.

BACKGROUND OF THE INVENTION

1. Field of the Invention

The invention relates to clutches, particularly for automatically operated automotive transmissions which have positive acting clutch components as well as non-positive acting clutch components. Multiplate clutches with hydraulic operation are generally known in the field of automatic transmissions. These clutches may include non-positive acting clutch components and require, as a function of the torque, a correspondingly high number of plates, resulting in drag losses and large construction space and the same are also expensive. Hydraulically operated jaw-type clutches, which are operated by means of an external hydraulic cylinder, are also known. These hydraulically operated jaw-type clutches have the disadvantage that they can be opened and closed only when they are unloaded. As a rule, the shift gearing of these jaw-type clutches has a drive face, which is perpendicular to the force applied along the circumference or which may even be undercut counter to the direction of shift in order to ensure safety against opening.

U.S. Pat. No. 3,679,032 discloses a clutch design which is similar to the clutches of the present invention in that it provides for fluid pressure pistons to shift the clutch rings for closing of the clutch. This prior art clutch is strictly a positive acting clutch having a straight clutch profile with the disadvantage that the clutch, after removal of the fluid shift pressure from the pressure piston, opens only after the clutch is unloaded and is free from torque.

German Offenlengungsschrift 1 575 802 discloses an electromagnetic clutch which has shift gearing that is similar to the subject matter of the present invention in that it produces an axial torque-dependent component of force. As is well known, however, these electromagnetic clutches occupy large construction spaces and therefore, for this and for other reasons having to do with the necessity for electrical supply and connections and the like, are unsuitable for use in motor vehicles.

The object of the invention is to provide a clutch which preferably serves for the range shifting of continuously variable transmissions and overcomes their drawbacks. It must be possible for the clutch to be disengaged when it is under load and it must be compact and short, especially in the axial direction.

Clutches embodying the invention offer the further advantages that they (1) can be economically employed and can be produced at low cost, (2) permit a small, compact mode of construction for several clutches in a clutch assembly, (3) are free from drag losses unlike the multiplate clutches of prior art, thus contributing toward improving the overall efficiency, (4) can be operated when synchronized and under load or at relatively low rotational speeds depending on the requirements of the range shifts in continuously variable transmissions, and (5) can be opened when under load.

These objects are achieved by the provision of a clutch mechanism which comprises an elongated shaft mounted for rotation about its longitudinal axis; a clutch carrier mounted on said shaft for rotation therewith in a fixed axial position; and first and second clutch assemblies, each of which include a movable ring and a mating ring. The rings of each assembly have facing interengageable clutch surfaces and the movable rings are mounted on the carrier for movement along respective axial paths with their respective clutch surfaces facing in the same axial direction. The mating rings are respectively positioned on the paths along which the movable rings move with their respective clutch surfaces facing in the opposite axial direction from the direction that the surfaces of the movable rings face. The mechanism also includes means carried by the carrier for moving the movable rings independently toward their respective mating rings. Preferably, the facing interengageable clutch surfaces of at least one of the assemblies comprise clutch profiles which are configured to assist in moving the rings apart under load. And preferably the means for moving the movable rings independently comprises a fluid actuated piston element for each movable ring. Further advantageous embodiments will becomes apparent from the description which follows.

The invention will now be described with reference to specific embodiments in conjunction with the accompanying drawings, in which.

Figure 1:
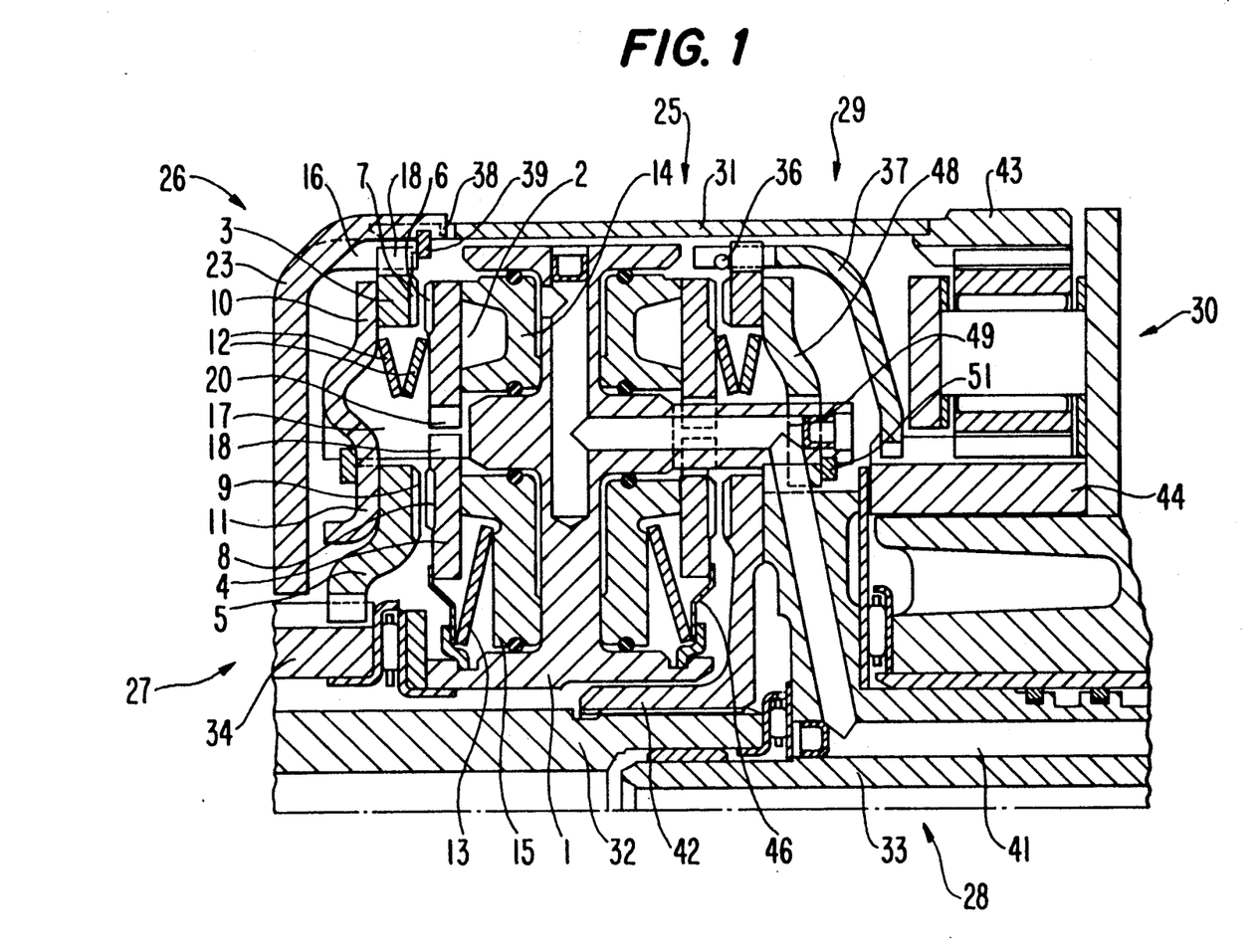
FIG. 1 is a cross-sectional, elevational view illustrating a four clutch assembly which embodies the concepts and principles of the present invention.

In FIG. 1, four clutches 26, 27, 28, 29 are arranged on a clutch carrier 1. A fluid pressure piston 14, 15 is assigned to each clutch. Preferably the pressure fluid is oil which can be applied under pressure. A pressure plate 10, 11 is mounted on the clutch carrier for rotation therewith. Also, a clutch ring 4 of clutch 27 and a clutch ring 2 of clutch 26 are fixedly coupled to carrier 1. Respective spring means 12, 13 are provided for urging clutch rings 2 and 4 and pistons 14, 15 back into their neutral positions. Clutch ring 3 of clutch 26, which is to be engaged with clutch ring 2, is mounted along the outer circumference of bell housing 23 with its dogs 18 in recesses 16 of housing 23 so that clutch ring 3 and housing 23 rotate together. Clutch ring 4 of clutch 27 engages along its outer circumference with carrier 1. In this regard, ring 4 has dogs 19 that are engaged in recesses 17 of the clutch carrier 1. Clutch ring 4 can be engaged via clutch profiles 8 and 9 with a clutch ring 5, which is seated on the outer gearing of a shaft 34.

Figure 4:
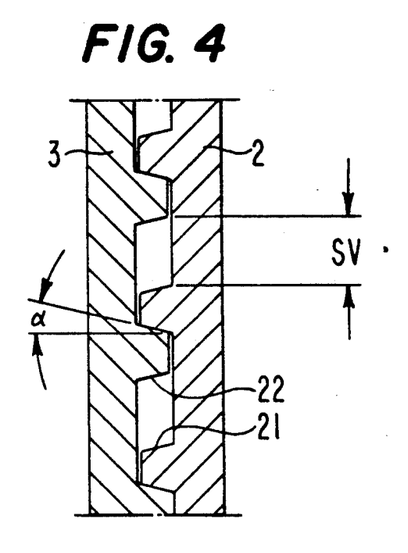
FIG. 4 is a partial cross-sectional view through the clutch rings, with the clutch closed.
Figure 5:
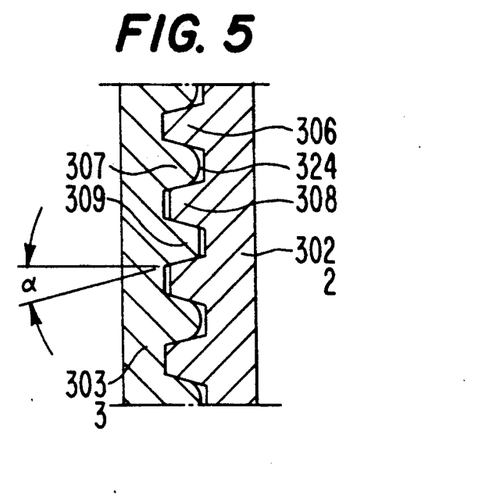
FIG. 5 is a partial cross-sectional view similar to FIG. 4 but illustrating an alternative clutch profile shape.

For shifting clutch 26, oil is introduced under pressure to the piston 14 via pressure line 41. The clutch ring 2 with its clutch profile 6 is pushed toward the clutch profile 7 of the clutch ring 3 against the influence of the spring 12. This causes the clutch bell housing 23 to be engaged with the clutch carrier 1. Preferably, the clutch profiles 6 and 7 of the clutch rings 2 and 3 are formed with faces 21 and 22 that are inclined at an angle α, as can be seen in FIGS. 4 and 5. Accordingly, as a result of the torque, a force component is generated in an axial direction in a direction to open clutch 26. This component of force ensures that the clutch 26, even when loaded, will open reliably and safely as a result of the drop in oil pressure when the latter has been released. The clutch profiles 6 and 7 can be made as short as 1 mm in the axial direction in order to reduce to a minimum the piston stroke for the piston 14 and/or the amount of shift oil necessary to move the clutch rings into interengagement. The necessary oil pressure, too, can be held relatively low, because in most applications it is sufficient to design the incline faces 21, 22 of the clutch profiles 6, 7 at an angle α, which need be only slightly greater than the inverse tangent of the coefficient of friction between the driving faces 20, 21 of the clutch profiles. This means that a correspondingly small axial force is necessary to keep the clutch closed. The spring 12 can be designed with an appropriately large spring loading in order to ensure in all operating conditions, that is to say, even if the torques are low, a rapid opening of clutch 26 against the pressure of the piston 14 and, in some cases, of the rotational pressure in the piston chamber in the disengaged condition.

Depending on the specific requirements of the transmission, this clutch system offers different shift characteristics. For example, when used in a continuously variable automotive transmission with several shift ranges, it is required that the clutch elements be very nearly synchronized when they come into engagement with each other. For example, if the clutch 26 is the first range clutch and the clutch 27 is the second range clutch, the shift operations are as follows. The clutch 26 is closed until the end of the first shift range. At the start of the second operating range, the clutch rings 4 and 5 are very nearly synchronized, after which, as a rule, the shift pulse for the closure of clutch 27 is generated automatically. After pressurization of the piston 15, the clutch profile 8 of clutch ring 4 becomes engaged with the mating profile 9 of the clutch ring 5. As soon as piston 15 is under full pressure, with profiles 8 and 9 in an engaged state, a signal for opening the clutch 26 can be released so that the oil pressure behind piston 14 spontaneously drops to zero and the piston 14 and the clutch ring 2 are urged back under the influence of the spring 12 to their neutral positions. If the loading of the spring 12 is insufficient for a spontaneous opening of the clutch, the opening of the clutch is accelerated by the axial force resulting from the inclined faces 21, 22 of the clutch profile 6, 7 over the angle α, as long as a torque is still being applied in one or the other direction of rotation of the clutch 26.

In order for the shift from one operating range to another operating range to occur as gradually as possible and without load interruption, the signal for opening the clutch to be disengaged may be triggered by the oil pressure of the sequence clutch, i.e., of the newly shifted clutch, either by releasing through the pressure signal of this sequence clutch an opening signal by hydraulic means to a pilot valve or by directly triggering via an electrical check-back signal from the oil pressure of the sequence clutch to the pilot valve of the clutch to be opened or, in some cases, via the electronic system from the command for opening the other clutch.

Figure 6:
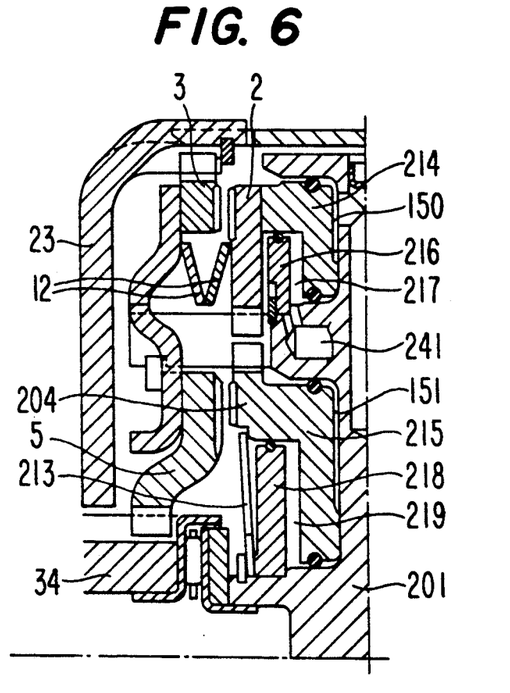
FIG. 6 a partial cross-sectional view through a clutch assembly to show two clutches with a doubleacting pressure piston.

For many applications, it is expedient to design the pressure piston 214, 215 (FIG. 6) with double-sided pressure actuation, so as to return the piston to its neutral position by oil pressure in the piston chamber 217, 219. In particular, this device makes sense if a very rapid and purposeful return of the pressure piston and of the clutch rings to the neutral position is necessary, or if the springs 12, 213 cannot be designed to provide a sufficient load. By means of this device, the springs 12, 213 can in many cases be dispensed with entirely, namely, if there is a permanent restoring pressure in the piston chamber 217, 219, which can be held relatively low. The restoring pressure in the piston chamber 217, 219 can be raised briefly in order to accelerate the shifting process during the shifting phase in order to return the pressure pistons 214, 215 rapidly to their neutral positions. According to another mode of control, the pressure to return the piston may simultaneously be fluid pressure of the sequence clutch, i.e., the clutch to be thrown and which acts either only during the shift phase of the piston of the clutch to be disconnected, or lasts during the entire time of disengagement. In this case, the pressure bearing on the clutch results from the differential faces of the piston chambers 150 and 217 or 151 and 219 and from the oil pressure. Depending on the structural aspects, the piston support ring 216, 218 may be a separate component, as shown in FIG. 6, or it may be integral with the clutch carrier.

In many applications it may be expedient to design the clutch profile with a torsion play SV. This has the advantage that, during the shifting, a more rapid engagement of the clutch elements is made possible, especially if, prior to the shifting, there is still a fairly large deviation from synchronism between the clutch elements. Within the torsion play SV, the differential rotational speed can be compensated for during the closing procedure. Greater deviations from synchronism can also be compensated for advantageously by rotatably mounted clutch rings 104, 105 with limited circumferential play under the influence of a spring such as the springs 180, 181. (See FIG. 2). Within the shift time, these clutch rings can be rotated in accordance with their relative rotational speeds until full engagement without torque is accomplished. A torsion play SV, as shown in FIGS. 3 and 4, is not necessary in this model. As shown in the embodiment illustrated in FIG. 5, a correspondingly larger number of clutch teeth can be mounted to the advantage of a lower compressive load per unit area or for the benefit of a lower shift profile and thus a smaller clutch travel SA. The springs 180, 181 may be designed either as torsion springs, as shown in FIG. 2, or as flat springs or in the form of rubber elements.

With regard to the alternating draw-and-push behavior in motor vehicles, the clutch is preferably adapted in such a way that there is no, or only a slight, torsional play both in the clutch gearing and between the faces of the dogs 19 and/or 20 and the recesses 17. A gradual range shifting without load interruption is achieved even in this embodiment, that is to say, in the shifting phase there is selectively and briefly produced via the control system a certain differential or relative rotational speed between the two clutch rings to be shifted in one or in both directions of rotation in order to permit a reliable engagement. This effect can be produced with relative ease by electronic means.

Figure 2:
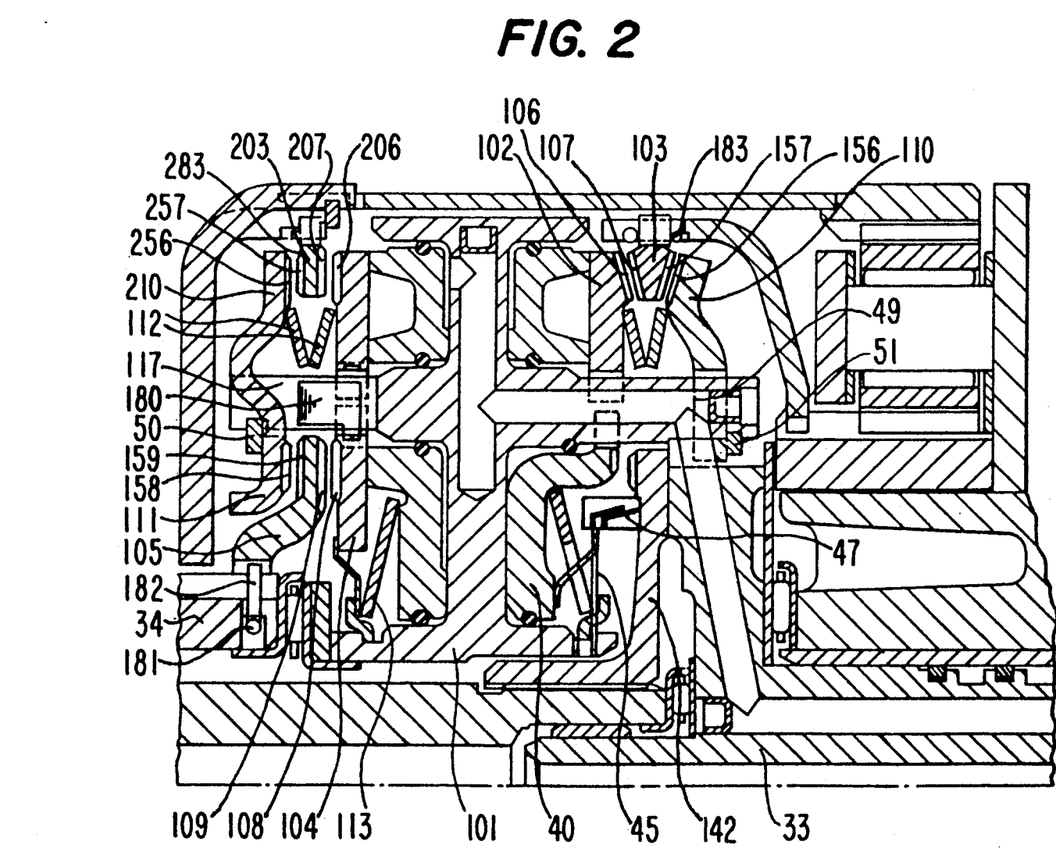
FIG. 2 illustrates another clutch assembly which embodies the invention.
Figure 3:
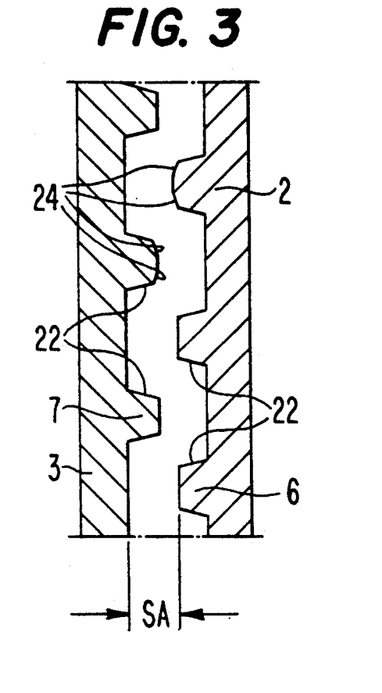
FIG. 3 is a partial cross-sectional view through the clutch rings of FIG. 1, with the clutch open.

For high torque loads, and as can be seen in FIG. 2, clutch rings 103, 105, 203, are formed on either side with respective clutch profile 107, 157, 109, 159, 207, 257. Here, the pressure plates 110, 111, 210 are likewise provided with respective clutch profiles 156, 256, 158. A prerequisite for this model is that the clutch rings 103, 105, 203 provided on either side with a clutch profile are mounted with allowance for axial movement and are held in the neutral position preferably by means of a spring 183, 181, 283.

The spring 181, in addition to the axial positioning of ring 105, also has the function of the resilient return of the clutch ring circumferentially to its central position with the clutch in its neutral position within a limited torsion play.

The clutch profiles 6, 7 are preferably provided with deflector faces or slip faces 24 (FIG. 3) in order to improve the engagement process and particularly in order to retain, in the closed state, a clutch ring in its neutral position at a relative rotational speed, while obviating the need for axially locking the same.

The individual components of the clutch can be produced using economical fabrication methods. The clutch rings 2, 3, 4, 5, 304, 305, including the clutch profiles, can be shaped without machining as stamped-and-pressed pieces from sheet metal or as fine-blanked pieces or precision-forged pieces or extrusion-molded pieces. Advantageously, the piston 14 is made as a pressure-die-cast piece. Pistons and clutch rings can be formed integrally, preferably as extrusion-molded pieces or also, as piston 40 (FIG. 2), as a stamped piece from sheet metal. The clutch carrier can be produced inexpensively as a sintered part or as a pressure-die-cast piece (AL-cast) for a relatively high number of pieces.

According to the version shown in FIG. 1, four clutches 26, 27, 28, 29 are combined into one unit, with clutches 26 and 27 on the one hand and clutches 28 and 29 on the other hand being concentrically arranged above and below one another and in radially spaced, generally coplanar alignment. For example, the clutch 26 can serve as a second range clutch, the clutch 28 as a third range clutch, and the clutch 29 as a reverse range clutch. All the clutches have a common clutch element, in this model the clutch carrier 1, which is non-rotatably attached to a shaft, preferably to an output shaft 33, and axially locked thereon.

Each clutch has a pressure plate 10, 11, 210, 110 which is seated on the clutch carrier 1 for rotation therewith and which is held in a fixed axial position relative thereto, at least in one direction. Clutch rings 3, 5 are fixed on a shaft or on a clutch bell housing 23, respectively, and axially abut a pressure plate 10, 11, thereby advantageously creating in some cases the possibility of integrally forming a clutch bell housing and a clutch ring, or a clutch ring and a shaft, in order to save costs, as shown, for example, by connecting sleeve 42.

FIG. 1 shows the combination of the whole clutch assembly 25 with a planetary gear train 30 in a compact mode of construction, wherein the internal gear 43 is connected with the clutch bell housing 23 and with the clutch ring 3, and the sun gear 44 of the planetary gear train is coupled with the clutch bell housing 37 of the clutch 29, e.g., in order to shift a reverse range of an automotive transmission.

The clutch can also be constructed with a synchronizing unit 47, (FIG. 2), particularly for use in an automatically operated step-by-step variable transmission. Depending on the requirement of the synchronizing power, a simple synchronization unit or a disabling synchronization unit may be used. In some cases, for low synchronization powers a synchronizing unit formed with a spring 45 and cooperating with a preferably conical synchronization face is sufficient. The spring 45 is non-rotatably connected to the clutch carrier 101 and is urged axially via the piston 40 against the conical frictional surface prior to the interengagement of the clutch profiles. In the case of high synchronization requirements, it is possible to provide a disabling synchronization unit of known construction in the same construction space.

For more rapid draining after disengagement, the piston chamber can be equipped with a bleed-off valve, which opens at low oil pressure or when there is no pressure.

In special cases, this clutch must be operated with air pressure, or in general with gaseous pressure media.

Due to the low hydraulic power needed for the pressure actuation of the clutches, both the pressure level and the necessary quantity of oil are lower than in automatic transmissions of the prior art with power-shift clutches with a view to further improving the overall efficiency. The variation possibilities mentioned above offer considerable adaptability to all kinds of requirements of especially automatically operated automotive transmissions.

The pressure plates 10, 11 and/or 210, 111 may be formed from a common component, which is preferably made as a stamped piece from sheet metal. By means of bars that engage recesses 17, 117 of the clutch carriers 1, 101, both pressure plates are connected to each other. With only one safety ring 50, both pressure plates are fixed in axial direction. The pressure plates 48 (FIG. 1) and 110 (FIG. 2) have driver members 49, which engage recesses of the clutch carrier 1, 101 and at the same time gear into recesses in a connecting element of the shaft 33, thereby establishing a rotary connection between clutch carrier 1, 101 and shaft 33. A safety ring 51 serves for axially fixing the pressure plates 48, 110 and at the same time for axially connecting shaft 33 to the clutch carrier 1, 101. Sintering technology can also be used very economically for the manufacture of the pressure plates, particularly if large quantities are involved.

Figure 5A:
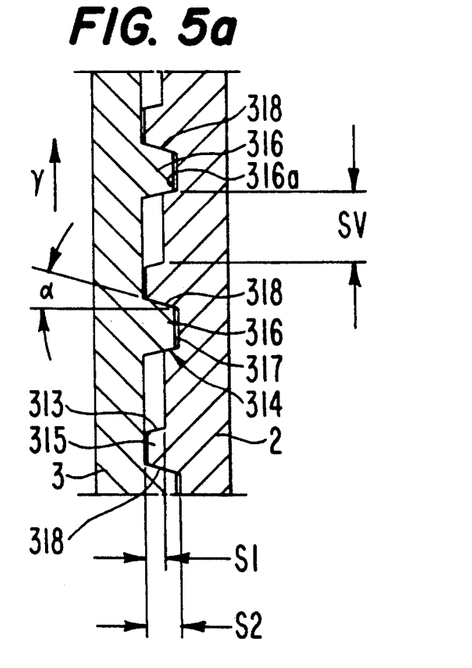
FIG. 5a is a partial cross-sectional view through the clutch rings to illustrate another shape of the clutch profile.

FIG. 5a shows another form of the clutch profile which, as exemplified by the construction of FIG. 4, has a torsion play SV, but with the difference that in the engaged state of the clutch this torsion play is cancelled out and is reinstituted at the appearance of a torque reversal, e.g., by the removal of fluid pressure from piston 14 or drift behavior of the vehicle. For this purpose, one of the two clutch rings, e.g., the clutch ring 2 has tooth gaps 317 which can be engaged without play by the clutch profile 3. In this case, the tooth gaps 317 are preferably mounted at one end of the torsion play SV, such that the direction of the loading of the principal torque, the direction of arrows Y, the larger profile faces of driving faces 318 of the two clutch rings, are torque-loaded. The clutch ring 2 shown in FIG. 5a also has large driving surfaces 318, which absorb the principal torque and small driving faces 314 which, as a rule, are loaded only in the case of a drift or gas removal, and other small driving faces 313, which are free, as shown, when the clutch is fully closed. The advantage of this clutch model shown in FIG. 5a also lies in the fact that the advantage of good engageability as a result of the torsion play or the torsion travel SV can be utilized and at the same time the clutch elements are free from torsion play when engaged. The shift teeth 316 of the clutch ring 3 abut with their inclined faces 316a snugly against the mating surfaces 314 of clutch ring 2.

Figure 7:
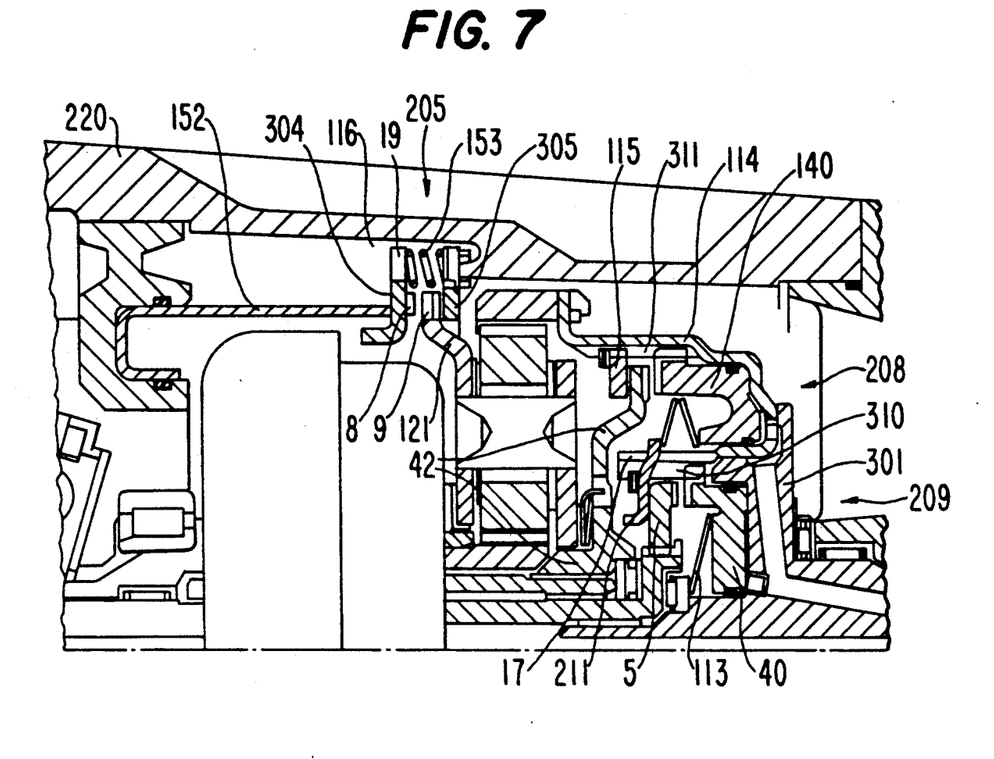
FIG. 7 illustrates alternative clutch designs in accordance with the invention.

FIG. 7 shows a clutch 205, wherein a transmission element, e.g., the planet carrier 121 of a planetary gear train, is connected to the casing 220. Here, the clutch carrier is the casing 220 which holds the clutch ring 304 and the pressure plate 305 with torsional rigidity. The clutch ring 304 can be moved axially against the pressure of a spring 153 mounted in the casing. A piston 152 formed from a stamped piece and mounted in a section of the casing 220, serves for closing the clutch 205, whereby the clutch ring 304 is moved axially so that its clutch profile 8 comes into engagement with the mating profile 9 of the clutch ring connected to the planetary carrier 121. Here, the clutch ring 304 is preferably formed as a stamped piece, which is mounted with its driving profile 19 disposed in contact with the mating faces 116 of the casing. The clutch profiles 8 and 9 of the two clutch rings can be designed at will, as shown in FIGS. 3 to 5a.

FIG. 7 also shows two further clutches 208 and 209, which are combined into one clutch assembly. The clutch carrier 114, which is made as a stamped piece of sheet metal for both clutches is, for example, connected to a transmission element formed as an internal gear and, for example, to a transmission output shaft. A shift piston 140 with clutch profile is non-rotatably mounted in the clutch carrier 114 over a driving profile. A pressure plate 221 of the clutch 209 reaches through recesses 17 of the clutch 114 and forms at the same time the axial attachment of the return springs of the clutch 208. A shift piston 40 of the clutch 209 with clutch profile is likewise non-rotatably mounted over a driving profile 301 stamped into the clutch carrier. The return spring 113 for the piston 40 serves at the same time for the axial play compensation for several transmission shafts. The clutch ring on the transmission element 42 can be slightly moved in the axial direction and, when engaged, is held against the influence of a spring in such a manner that between pressure plate 115 and the clutch ring a condition prevails which is as free of contact as possible in order to rule out drag loses. The clutch ring 5 is likewise movable in an axial direction in order to ensure, in the disengaged condition, that it bears without load against the pressure disc 211 and in order to able to adapt itself axially when engaged.

Figure 8:
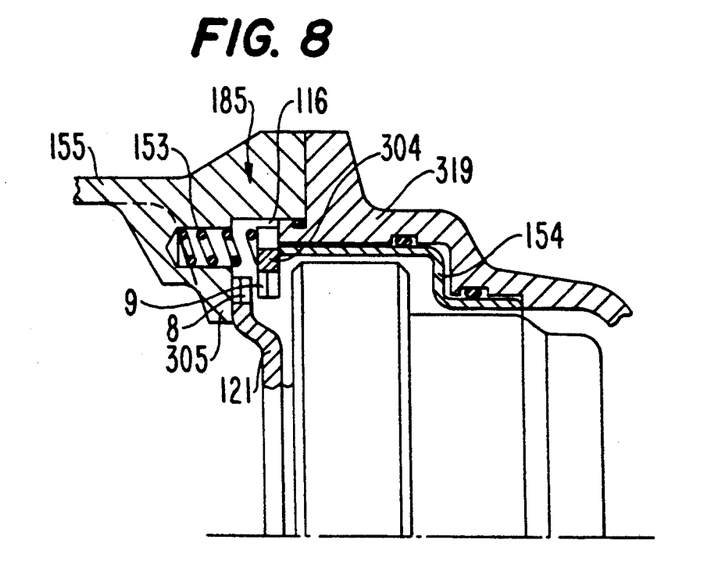
FIG. 8 shows a clutch design with clutch elements that are fixed to the casing.

FIG. 8 shows a clutch 185 for joining a transmission element 121 to the casing 155. A clutch ring 304 is rigidly connected to the casing 155. The return springs 153 are mounted in the casing.

A separate pressure plate is not necessary, since it can be replaced by a flange 305 of the casing 155. A shift piston 154, preferably formed as a stamped piece from sheet metal, is mounted in a casing element 319 and, in order to shift the clutch, urges the clutch ring 304 with its shift gearing or with the clutch profile 9 against the clutch profile 8 of the transmission element 121. The clutch ring 304 is non-rotatably mounted with the casing 155 over the profile 116 and is mounted with allowance for axial movement. This clutch model is inexpensive to produce.

When used in a continuously variable transmission with several shift ranges, the pulse for the range shift results from a synchronous signal caused by the synchronization of the corresponding clutch elements and/or from a signal of an adjustment element of a continuously variable transmission element, e.g., from the setting angle of a hydrostatic unit as a function of a variable that corresponds to the synchronism. Synchronous inaccuracies of the clutch elements, caused, for example, by oil leakage losses from a hydrostatic element or other losses are compensated for in this clutch system.

Depending on the constructional or the structural aspects of the transmission, other different clutch models can be formed with these novel features, whereby, for example, the shift piston and the clutch ring are formed integrally and the piston chamber is formed by a stamped piece from sheet metal or is installed in the casing. These models are not shown in the drawings.

This novel clutch has the additional advantage that modern fabrication methods such as sheet metal technology, sintering technology, etc., can be used to a very large extent so that, in addition to the advantage of construction space, great cost advantages can be achieved by economic fabrication.

I claim:

1. A clutch mechanism comprising:
   an elongated shaft mounted for rotation about its longitudinal axis;
   a clutch carrier mounted on said shaft for rotation therewith in a fixed axial position;
   first and second clutch assemblies, each including a movable ring and a mating ring, the rings of each assembly having facing interengageable clutch surfaces, the facing interengageable clutch surfaces of at least one of said assemblies comprising clutch profiles which are configured to assist in moving the rings apart under load,
   said movable rings being mounted on said carrier for movement along respective axial paths with their respective clutch surfaces facing in the same axial direction,
   said mating rings being respectively positioned on said paths with their respective clutch surfaces facing in the opposite axial direction; and
   means carried by said carrier, comprising a respective fluid actuator piston element for each movable ring, for moving said movable rings independently toward their respective mating rings.

2. A clutch mechanism as set forth in claim 1, wherein said carrier includes means defining a fluid supply channel for supplying fluid under pressure to said piston elements.

3. A clutch mechanism as set forth in claim 1, wherein said mechanism comprises two sets of said first and second clutch assemblies.

4. A clutch mechanism as set forth in claim 3, wherein said carrier includes means defining a fluid supply channel for supplying fluid under pressure to said piston elements.

5. A clutch mechanism as set forth in claim 1, wherein is included spring means urging each said movable clutch ring away from its corresponding mating ring.

6. A clutch mechanism as set forth in claim 1, wherein is provided means for selectively moving at least one of said movable rings away from its corresponding mating ring.

7. A clutch mechanism as set forth in claim 1, wherein is provided an axially fixed pressure plate means carried by said carrier for rotation therewith, said pressure plate means including a pressure plate component disposed adjacent each mating ring on the opposite side of the latter from the movable ring.

8. A clutch mechanism as set forth in claim 7, wherein the pressure plate components for the mating rings are separate portions of a single rigid pressure plate member.

9. A clutch mechanism as set forth in claim 1, wherein said mating rings are arranged concentrically in radially spaced, generally coplanar alignment.

* * * * *

UNITED STATES PATENT AND TRADEMARK OFFICE
CERTIFICATE OF CORRECTION

PATENT NO. : 5,035,310
DATED : July 30, 1991
INVENTOR(S) : MICHAEL MEYERLE

It is certified that error appears in the above-identified patent and that said Letters Patent is hereby corrected as shown below:

FRONT PAGE [30] Foreign Application Priority Data insert
--Jul. 20, 1987 [DE] Fed. Rep. of Germany ... PCT/DE87/00324--.

Column 2, line 41, "doubleacting" should be --double-acting--.

Signed and Sealed this

Sixteenth Day of March, 1993

*Attest:*

STEPHEN G. KUNIN

*Attesting Officer*     *Acting Commissioner of Patents and Trademarks*